United States Patent [19]

Kindervater et al.

[11] Patent Number: 4,946,721

[45] Date of Patent: Aug. 7, 1990

[54] COMPOSITE FOR THE ABSORPTION OF ENERGY

[75] Inventors: Christof Kindervater; Helmut Weissinger, both of Stuttgart, Fed. Rep. of Germany

[73] Assignee: Stamicarbon B.V., Geleen, Netherlands

[21] Appl. No.: 291,232

[22] Filed: Dec. 28, 1988

[30] Foreign Application Priority Data

Dec. 28, 1987 [DE] Fed. Rep. of Germany ....... 3744349

[51] Int. Cl.$^5$ .............................................. D03D 3/02
[52] U.S. Cl. ................................... 428/36.1; 138/123; 428/363; 428/105; 428/113; 428/182; 428/224; 428/232; 428/245; 428/253; 428/284; 428/285; 428/408; 428/413; 428/415; 428/902
[58] Field of Search ............... 428/113, 114, 413, 415, 428/408, 232, 246, 285, 902, 911, 105, 182, 253, 245, 232, 264, 36.1, 36.3; 138/123

[56] References Cited

U.S. PATENT DOCUMENTS

| | | | |
|---|---|---|---|
| 4,455,273 | 6/1984 | Harpell et al. | 264/184 |
| 4,457,985 | 7/1984 | Harpell et al. | 428/911 |
| 4,584,347 | 4/1986 | Harpell et al. | 525/119 |
| 4,612,148 | 9/1986 | Motooka et al. | 264/49 |
| 4,621,980 | 11/1986 | Reavely et al. | 428/413 |
| 4,748,064 | 5/1988 | Harpell et al. | 428/113 |
| 4,767,017 | 8/1988 | Logullo et al. | 428/413 |
| 4,820,568 | 4/1989 | Harpell et al. | 428/911 |

FOREIGN PATENT DOCUMENTS 0110021 6/1984 European Pat. Off. .
0144997 6/1985 European Pat. Off. .

OTHER PUBLICATIONS

Energy Absorbing Qualities of Fiber Reinforced Plastic Tubes, by C. M. Kindervater; DFVLR, Institut fur Bauweisen- und Konstruktionsforschung Pfaffenwaldring 38/48, D-7000 Stuttgart 80. W. Germany; Mar. 23–25, 1983.

Primary Examiner—James J. Bell
Attorney, Agent, or Firm—Cushman, Darby & Cushman

[57] ABSTRACT

A composite for the absorption of energy comprising fibers having a breaking length of at least 80 km and an elongation at break of at least 2%, such as fibers of a linear polyethylene of ultrahigh molecular weight, and carbon fibers or glass fibers, embedded in a matrix. The first fibers are preferably arranged at obtuse angles (±(45° to 95°)) and the carbon fibers or glass fibers are preferably arranged at acute angles (0° to ±30°) to the direction of pressure application in the matrix. The composites may be designed in the form of tubes or corrugated plates (FIG. 5).

18 Claims, 2 Drawing Sheets

COMPOSITE FOR THE ABSORPTION OF ENERGY

BACKGROUND OF THE INVENTION

1. Field of the Invention

The invention relates to a composite for the absorption of energy, comprising a matrix of embedded fibers.

The composites are used, for example, in motor vehicles for the mounting of fenders or other parts which are needed to convert kinetic energy into deformation energy in a collision. Composites are known in which glass fibers or carbon fibers are embedded in a matrix of epoxy resin. Although such composites, in particular those with carbon fibers, can absorb a relatively high energy, they exhibit an uncontrolled behavior and are so brittle that they splinter in a collision and the mechanical connection is broken.

The present invention is based on the object of creating a composite which exhibits a controlled behavior, has a high energy absorption capacity, and does not splinter but retains structural continuity.

This object of the invention is achieved by using fibers having a breaking length of at least 80 km and an elongation at break of at least 2% embedded in a matrix at an angle of $+/-$ (45° ....90°) to the direction of pressure application. The fibers preferably consist of a linear polyethylene (PE) of ultrahigh molecular weight, $M > 10$ g/mol.

A process for the production of such fibers of a linear polyethylene of ultrahigh molecular weight is described, for example, in GB-A-2042414 and 2051667. In this case, a polyolefin is dissolved in a solvent, the solution is deformed into fibers at a temperature above the solution temperature of the polYolefin, the fibers are cooled to a temperature below the solution temperature for gelation and the gelled fibers are stretched. Stretching takes place with solvent removal. This procedure yields fibers with extremely long and highly oriented molecules. Such fibers when used in composites within a matrix of a resin exhibit a controlled failure with high energy absorption, i.e., it can be predicted how and when the body deforms with static or dynamic application of the load.

The polyethylenes may contain minor amounts, preferably at most 5 mol%, of one or more other alkenes capable of copolymerization with them, such as propylene, butylene, hexene, 4-methylpentene, octene etc. and have 1 to 10, in particular 2 to 6 methyl or ethyl groups per 1000 carbon atoms.

Other polyolefins also can be used. For example, polypropylene homopolymers and copolymers can be used in the present invention. Furthermore, the polyolefins used may also contain minor amounts of one or more other polymers, in particular alkene-1 polymers.

In a further development of the invention, these fibers are embedded in a matrix with other, preferably inorganic, fibers. The other fibers form an acute angle from 0° to $+/-$ to the direction of pressure application.

According to a preferred embodiment of the present invention, a plurality of layers of the different fibers are arranged alternately. For example, fibers having a breaking length of at least 80 km and an elongation at break of at least 2%, or PE fibers, may be arranged on the outsides. These fibers may surround other fibers, such as inorganic fibers. Thus, for example, if carbon fibers or glass fibers are used with preference as to other fibers, these fibers are prevented from breaking by the surrounding fibers having a breaking length of at least 80 km and an elongation at break of at least 2%, or by the PE fibers. In this manner, the high energy absorption properties of the carbon fibers or glass fibers are combined with the properties of the controlled-deforming first fiber.

According to a preferred embodiment, the proportion of the fibers is 40 to 85% by volume, the proportion of the fibers having a breaking length of at least 80 km and an elongation at break of at least 2%, or of the PE fibers, preferably being 10 to 85% by volume.

Preferably, the fibers having a breaking length of at least 80 km and an elongation at break of at least 2%, or the PE fibers, are arranged at an angle of $+/-$ (45° to 90°), and the other fibers are arranged at angles of $+/-$ (0° to 30°) to the direction of pressure application. The other fibers in this case preferably have a low elongation at break ($<5\%$) and consist, for example, of carbon fibers or glass fibers.

The matrix in which the fibers are embedded in layers preferably consists of a duroplastic or thermoplastic matrix system with a processing temperature of up to about 130° C., e.g., an epoxy resin, a polyester or another material system that is compatible with the fibers having a breaking length of at least 80 km and an elongation at break of at least 2%, or with the PE fibers.

The composite preferably has the form of a hollow body of any cross-section perpendicular to the axis of pressure application. For example, the composite can be in the form of a tube or a box girder.

According to a further preferred embodiment, the composite is made as an integrally stiffened plate, such as a corrugated plate. In a corrugated plate, the pressure is applied parallel to the extent of the width of the corrugations. The corrugated plates are preferably fastened at their edges, so that a controlled buckling or a controlled folding takes place when a load or impact force is applied.

In a further development of the invention, the cross-section changes in the direction of the pressure application with respect to the cross-sectional area or the cross-sectional shape.

Such composites are suitable in particular for supporting frames of helicopters, for floors of helicopters, for mounting fenders, for aircraft seats or elements where the occurrence of impact energies is to be expected.

The fibers in the layers preferably take the form of roving, woven fabrics, knitted fabrics, ribbons or braided or woven hoses, including intralaminar fiber mixtures containing fibers having a breaking length of at least 80 km and an elongation at break of at least 2%, or the PE fibers.

According to a further preferred embodiment, for the reduction of initial load peaks, the laminate, the fastening or the supports designed at one or both ends of the composite as a fail initiator (trigger mechanism), which is structurally formed in such a way that it contributes to an energy-consuming snapping of the 90°-oriented fibers having a break of at least 2%, or of the PE fibers.

BRIEF DESCRIPTION OF THE DRAWINGS

The invention is explained in more detail below with reference to the drawings.

DETAILED DESCRIPTION OF THE PREFERRED EMBODIMENT

Figure 1:
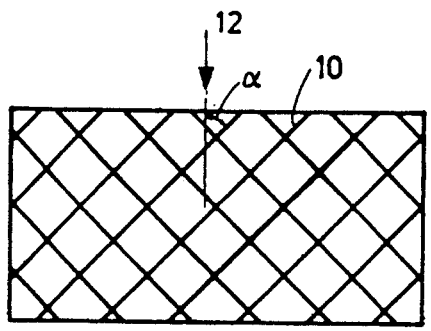
FIG. 1 shows the orientation of polyethylene fibers in a matrix of epoxy resin of 45° to the direction or pressure application (inorganic fibers are not shown).

In the case of the embodiment shown in FIG. 1, fibers 10 of a linear polyethylene (PE) of ultrahigh molecular weight are arranged at an angle α of +/−45° to the direction of pressure application, which is indicated by the arrow 12. The PE fibers are a preferred embodiment of fibers having a breaking length of at least 80 km and an elongation at break of at least 2%.

Figure 2:
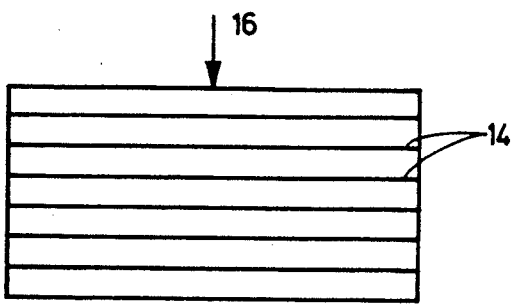
FIG. 2 shows the orientation of polyethylene fibers in a matrix perpendicular to the direction of pressure application (without inorganic fibers).

In the case of the embodiment shown in FIG. 2, polyethylene fibers 14 are provided perpendicular to the direction of pressure application, which is indicated by the arrow 16, in a matrix.

Figure 3:
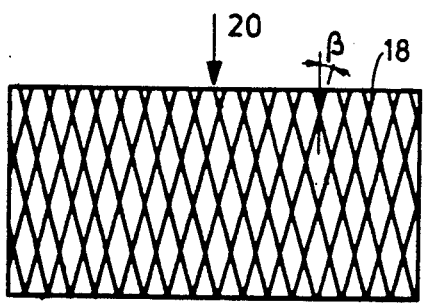
FIG. 3 shows the orientation of carbon fibers or glass fibers in an epoxy matrix at +/−15° to the direction of pressure application.

FIG. 3 shows the arrangement of carbon fibers in a matrix, in which the polyethylene fibers may be arranged at angles which are shown in FIGS. 1 and 2. The carbon fibers 18 in FIG. 3 are oriented at angles β of +/−15° to the direction of pressure application, which is indicated by the arrow 20.

Figure 4:
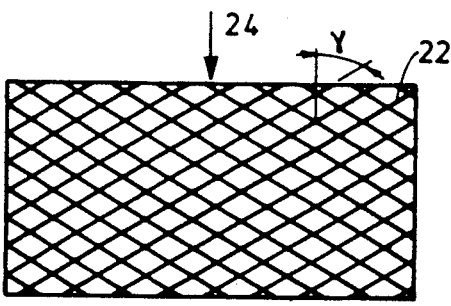
FIG. 4 shows the orientation of PE fibers at 60° to the direction of pressure application.

FIG. 4 shows PE fibers 22, in a matrix of epoxy resin, which are arranged at angles τ of +/−75° to the direction of pressure application 24.

Figure 5:
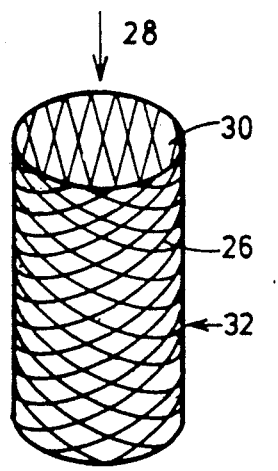
FIG. 5 shows a composite in the form of a tube with polyethylene fibers arranged at +/−60° and carbon fibers arranged at +/−15° in an epoxy matrix.

FIG. 5 shows a composite in the form of a tube with PE fibers 26 of ultrahigh molecular weight oriented at an angle of +/−60° to the direction of pressure application, which is indicated by the arrow 28, and embedded in a matrix of epoxy resin. In addition, carbon fibers 30, which are oriented at angles of +/− 15° to the direction of pressure application, are embedded in the matrix. The PE fibers and the carbon fibers are embedded in the matrix in layers, so that layers of PE fibers are on the outside and on the inside of the composite. When loaded in the direction of the arrow 28, the tubular composite 32 is compressed with more or less regular folds developing during the absorption of the energy.

Figure 6:
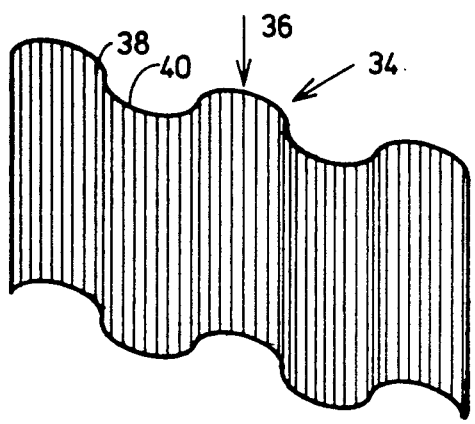
FIG. 6 shows a composite in the form of a corrugated plate.

FIG. 6 shows a composite 34 in the form of a corrugated plate. The pressure is applied in the direction of the arrow 36, i.e., parallel to the extent of the width of the corrugations 38, 40 of the composite 34. The fibers of polyethylene of ultrahigh molecular weight and the carbon fibers or glass fibers may be oriented analogously to the embodiments exemplified in FIGS. 1 to 4. In the case of the embodiment according to FIG. 6 as well, it is preferred that layers of polyethylene fibers are embedded in the matrix on the outside.

Figure 7:
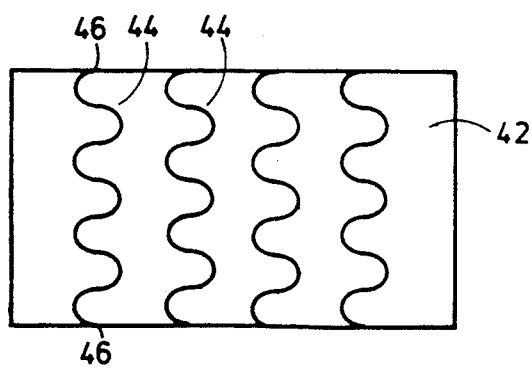
FIG. 7 shows an arrangement of composites according to FIG. 6 in plan view, as are used for example in the floor of a helicopter.

FIG. 7 shows a plan view of a floor 42, for example of a helicopter, in which composites 44 are arranged. The composites are designed like the composite illustrated in FIG. 6. Preferably, the ends 46 of the composites 44 are fastened in a frame, so that the composites cannot slip away when pressure is applied. The composites 44 are designed in such a way that 0 the preferred direction of pressure application takes place perpendicular to the plane of the drawing.

The invention will be elucidated in the following examples, without being limited thereby.

Example 1

By wet filament-winding technique tubes containing PE fiber Dyneema SK 60 (Dyneema is a trademark of DSM) and an epoxy resin system containing base resin type Arldit Ly 556, hardener type HY 917, catalyst type DY 026 (Araldit is a trademark of Ciba Geigy) and prepared according to suppliers prescription were fabricated.

The filament winder was adjusted for +/−45° fiber orientation relative to the tube axis. The tubes were wound in cross over technique on a collapsible steel mandrel having an outer diameter of 25 mm and 250 mm length with a circular cross section. Prior to winding the mandrel was covered with a Teflon foil.

The tubes were cured 4 hours at 80° C. and 4 hours at 120° C. at 1 atm. pressure. The mandrel was removed and the tube were cut into specimens of about 68 mm length (sample 1). The average wall thickness of the specimens was 1.5 mm. The Dyneema fiber volume fraction was about 50%.

The same procedure was followed to produce specimen (sample 2) with aramid fibers, Kevlar 49 (Kevlar is a trademark of Dupont) and (sample 3) carbon fibers, T300, supplied by Toray.

Example 2

Following the same procedure described in example 1, tubes (sample 4) having a hybrid fiber structure containing Dyneema SK 60 fibers with +/−75° orientation related to the tube axis at the inner and outer diameter and having a midsection of carbon fibers T 300 with +/−15° orientation related to the tube axis were fabricated. The specimens had an average wall thickness of about 1.3 mm. The volume fractions of carbon fibers and of Dyneema fibers were both about 25%. A second type of hybrid Dyneema/carbon fiber tubes (sample 5) were fabricated having Dyneema SK 60 fiber orientation of 90° and carbon fiber T 300 of 020 relative to the tube axis.

The Dyneema fibers were wound as before, and the carbon fibers were wrapped around the tube after the first Dyneema fiber layer was wound. After the rest of the Dyneema fibers were wound, specimens were fabricated as previously described. The specimens had an average wall thickness of 1.3 mm. The volume fractions of carbon fibers and Dyneema fibers were both about 25%.

Example 3

Specimens containing Dyneema fibers (sample 1) and aramid fibers (sample 2) fabricated in example 1 were tested.

The specimens were fixed with a center bolt at the bottom, and a bevel trigger cone at the upper tube in order to initiate a stable and progressive failure mode. Cone angle was 60°. The specimens were centered between parallel heads of a standard testing machine (Delivered by Zwick Company, Type 1486). The rate of load application was set to 5 mm/min. Table 1 sets forth the results of these tests.

TABLE 1

| Sample | Fiber type, orientation | Energy absorption by mass [kj/kg] | Crush stress [MPa] | Load uniformity |
|---|---|---|---|---|
| 1 | Dyneema SK 60, +/−45 | 28.7 | 30 | °OX 1.58 |
| 2 | Kevlar 49, +/−45 | 13.4 | 18 | 2.46 |

Example 4

Specimens containing Dyneema/carbon hybrid fiber structures (sample 4, 5) fabricated in example 2, and specimens containing carbon fibers (sample 3) fabricated in example 1 were tested as described in example 3. The results are given in Table 2.

TABLE 2

| Sample | Fiber type, orientation | Energy absorption by mass [kj/kg] | Crush stress [MPa] | Load uniformity |
|---|---|---|---|---|
| 4 | Dyneema, +/−75°; carbon, +/−15° | 90 | 108.4 | 1.24 |
| 5 | Dyneema, 90°; carbon 0° | 110 | 140 | 1.20 |
| 3 | carbon +/−45° | 88 | 128 | 1.39 |

Both specimens containing Dyneema fibers and carbon fibers (samples 4,5) failed so that after the test structural continuity was retained. Specimens containing only carbon fibers were splintered in separate pieces and structural continuity was not retained.

Example 5

Specimens containing Dyneema fibers (sample 1) were tested according to the method described in example 3. The rates of load application were 5 and 500 mm/min.

Another set of sample 1 specimens was tested in a drop tower. The specimens were positioned on the clamping plate at the bottom of the tower. The drop weight mass was adjusted to the appropriate drop height so that the specimen was hit with about 160 J initial kinetic energy.

At the upper end of the specimen, a bevel trigger cone was provided. The cone angle was 60°. Specimens were tested at 3, 6 and 9 m/sec initial impact speeds.

The results of these tests are given in Table 3.

TABLE 3

| Sample | Testing Speed | Energy absorption by mass [kj/kg] | Crush stress [MPa] | Load uniformity |
|---|---|---|---|---|
| 1 | 5 mm/min | 28.7 | 29.7 | 1.6 |
| 1 | 500 mm/min | 31.6 | 31.9 | 1.4 |
| 1 | 3 m/sec | 41.1 | 44.1 | 1.4 |
| 1 | 6 m/sec | 38.1 | 39.8 | 1.5 |
| 1 | 9 m/sec | 40.2 | 42.0 | 1.5 |

What is claimed is:

1. A composite for the absorption of energy consisting of a matrix of embedded fibers, containing fibers having a breaking length of at least 80 km and an elongation at break of at least 2%, wherein the fibers are embedded in a matrix with other, preferably inorganic fibers, which form an acute angle of 0° to +/−30° to the direction of pressure application.

2. A composite as claimed in claim 1, wherein the fibers having a breaking length of at least 80 km and an elongation at break of at least 2% consist of a linear polyethylene (PE) of ultrahigh molecular weight $M > 10^5$ g/mol.

3. A composite as claimed in claim 1, wherein a plurality of layers of the different types of fibers are arranged alternately.

4. A composite as claimed in claim 1, wherein the, fibers having a breaking length of at least 80 km and an elongation at break of at least 2%, or PE fibers, are arranged on the outsides.

5. A composite as claimed in claim 1, wherein the proportion of the fibers is 40–85% by volume.

6. A composite as claimed in claim 1, wherein the fiber content of the fibers having a breaking length of at least 80 km and an elongation at break of at least 2%, or of the PE fibers, is 10 to 85% by volume.

7. A composite as claimed in claim 1, wherein the fibers having a breaking length of at least 80 km and an elongation at break of at least 2%, or the PE fibers, are arranged at an angle of +/−(45°-90°) and the other fibers are arranged at an angle of +/−(0°-30°) to the direction of pressure application.

8. A composite as claimed in claim 1, wherein the other fibers have low elongation at break (<5%).

9. A composite as claimed in claim 1, wherein the other fibers are carbon fibers or glass fibers.

10. A composite as claimed in claim 1, wherein the matrix consists of epoxy resin, polyester, or of another material system compatible with the fibers having a breaking length of at least 80 km and an elongation at break of at least 2%, or with the PE fibers.

11. A composite as claimed in claim 1, wherein the composite is a hollow body of any cross-section perpendicular to the axis of pressure application, for example a tube or a box girder.

12. A composite as claimed in claim 1, wherein said composite is made as an integrally stiffened plate, for example as a corrugated plate.

13. A composite as claimed in claim 11, wherein the cross-section changes in the direction of the pressure application with respect to the cross-sectional area and/or the cross-sectional snape.

14. A composite as claimed in claim 1, wherein it is used as a supporting frame or floor for helicopters, as seats for aircraft, as fenders for motor vehicles or the like.

15. A composite as claimed in claims 1, wherein the fibers in the layers take the form of roving, woven fabrics, knitted fabrics, ribbons or braided or woven hoses.

16. A composite as claimed in claim 1, wherein, for reduction of initial load peaks, the laminate, the fastening or the support is designated at one or both ends of the composite as a fail initiator or trigger mechanism, which is structurally formed in such a way that it contributes to an energy-consuming snapping of the 90°-oriented fibers having a breaking length of at least 80 km and an elongation at break of at least 2%, or of the PE fibers.

17. A composite for the absorption of energy comprising fibers having breaking length of at least 80 km and an elongation at break of at least 2% embedded in a matrix at an angle of +/−45° to 90° to the direction of pressure application; and further comprising inorganic fibers which form an acute angle of 0° to +/−30° to the direction of pressure application and wherein said inorganic fibers are embedded in the matrix.

18. A composite as claimed in claim 11, wherein said composite is a hollow body in the shape of a tube or box girder.

* * * * *